United States Patent [19]

Otto

[11] 4,056,640
[45] Nov. 1, 1977

[54] METHOD AND APPARATUS FOR MAKING CONFECTIONERIES

[75] Inventor: Friedrich Otto, Hameln, Weser, Germany

[73] Assignee: A. Stephan U. Sohne GmbH & Co., Hameln, Weser, Germany

[21] Appl. No.: 650,235

[22] Filed: Jan. 19, 1976

[30] Foreign Application Priority Data

Jan. 18, 1975 Germany .............................. 2501933

[51] Int. Cl.² .............................................. A23G 3/00
[52] U.S. Cl. .................................... 426/573; 426/578; 426/660; 426/476; 426/510
[58] Field of Search ............... 426/578, 660, 476, 510, 426/523, 573

[56] References Cited

U.S. PATENT DOCUMENTS

| | | | |
|---|---|---|---|
| 2,678,276 | 5/1954 | North | 426/578 |
| 2,726,960 | 12/1955 | Bolanowski | 426/578 |
| 3,038,809 | 6/1962 | Fitzmaurice et al. | 426/578 |
| 3,356,045 | 12/1967 | Karpenko et al. | 426/660 |
| 3,374,096 | 3/1968 | Knoch | 426/660 |

*Primary Examiner*—Jeanette M. Hunter
*Attorney, Agent, or Firm*—Michael J. Striker

[57] ABSTRACT

A method of making confectioneries, particularly hard and soft caramel and jelly and gum products, by combining regulated quantities of the ingredients and mixing. During the mixing operation, steam is admitted into the mass of ingredients so as to directly heat the same for cooking of the ingredients. The mixing operation is carried out with rotary elements which rotate at speeds between 1500 and 3000 revolutions per minute.

11 Claims, 1 Drawing Figure

U.S. Patent     Nov. 1, 1977     4,056,640
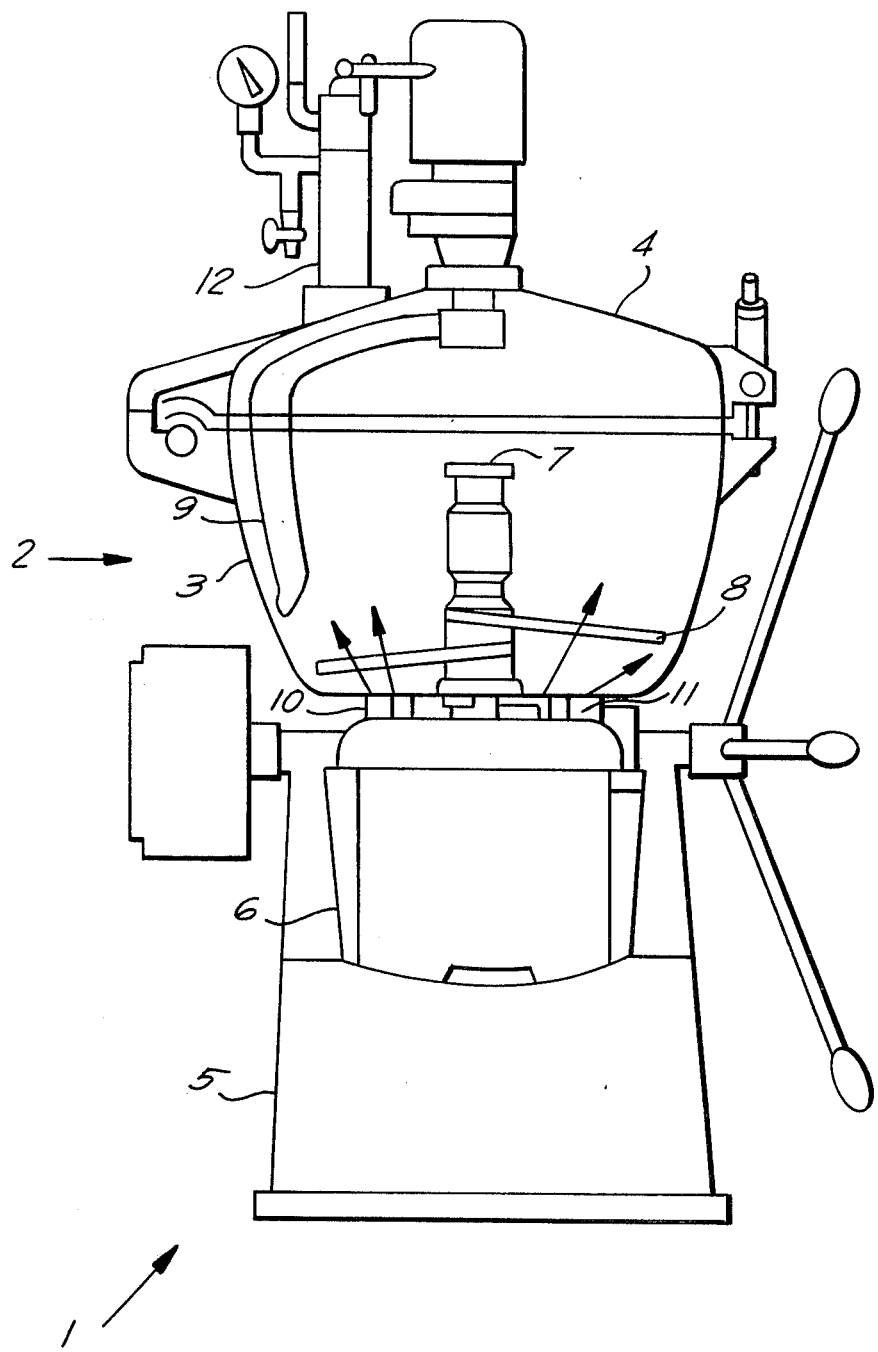

METHOD AND APPARATUS FOR MAKING CONFECTIONERIES

BACKGROUND OF THE INVENTION

The invention relates generally to a method and arrangement for the production of confectioneries. Of particular interest to the invention is the manufacture of high-boiled sweets such as hard caramel, low-boiled sweets such as soft caramel, jelly products and gum products.

In a known method for the manufacture of confectioneries, the ingredients are fed into a precooking machine in regulated quantities using a dosing device. Here, ingredients such as, for example, glucose syrup, which must themselves be manufactured by suitably combining and treating various constituents, are previously prepared and fed into the precooking machine in a prepared form. All of the ingredients in the precooking machine are mixed with one another solely by virtue of the small amount of turbulence which is generated by the precooking operation. The heating of the ingredients is effected indirectly by means of a heating jacket or coiled pipes arranged about the container in which the ingredients are accommodated. In this manner, the ingredients are heated to a maximum temperature of 110° C. The precooked mass thus obtained is then pumped into a cooking machine and further heated to a temperature of about 140° C. The energy for the heating is, as a rule, supplied via saturated steam. The cooking process may take place under vacuum. After reaching the just-mentioned final temperature of about 140° C, the mass is dried to a residual moisture content of about 1 to 2 percent by weight with the aid of the vacuum and a condenser.

In the above-described method, as well in the other known methods to be described below, it is necessary to add approximately 20 percent by weight of water or moisture to the ingredients of the confectionery at the beginning of the production operation, that is, it is necessary to form a mass containing about 80 percent by weight of dry solids. The reason is that the design of the prior art apparatus is such that a satisfactory mixing of the ingredients cannot be assured with moisture contents of less than about 20 percent by weight. Depending upon the type of confectionery being manufactured, it may be necessary to demoisturize the mass of ingredients to a moisture content of 1.5 to 2 percent by weight at the end of the production process, that is, to a moisture content corresponding to about 98 to 98.5 percent by weight of dry matter. The process of demoisturizing, e.g. hard caramel, from 80 percent by weight of dry matter to between 98 and 98.5 percent by weight of dry matter is effected into stages and in two different apparatus.

In the method described above, the first demoisturizing stage is carried out in the precooking machine and involves a demoisturization from 80 percent by weight of dry matter to about 93 percent by weight of dry matter. The second stage of demoisturization is carried out in the vacuum cooking machine and involves a demoisturization from about 93 percent by weight of dry matter to between 98 and 98.5 percent by weight of dry matter.

A considerable disadvantage of the method outlined above resides in that a large quantity of water must be added to the ingredients. This is necessary not only to achieve an intimate mixing of all the ingredients as already mentioned but also for the dissolution of the sugar. Aside from these considerations, there is the further consideration that the mixing process utilized requires the mass of ingredients to have a relatively low viscosity. Thus, prior to the demoisturizing process, the percentage of dry matter is generally relatively low and, more particularly, has a value of only about 80 percent by weight. As a result, the demoisturizing process requires a relatively long period of time in comparison to the overall duration of the production process. Furthermore, the method outlined above is relatively complicated to carry out in practice since two apparatus are necessary, namely, a machine for the dissolution and precooking operations and a vacuum cooking machine. A further disadvantage of the abovedescribed method resides in that the indirect heating utilized leads to a poor thermal efficiency.

The method outlined above may today be considered as outmoded. On the other hand, another widely known method has come into being which, up to and including the precooking process, corresponds to the outmoded method described earlier. In this more modern method, the mass which leaves the precooking machine is conveyed into a buffer tank. From the buffer tank, the mass is pumped through a coiled pipe for cooking. The coiled pipe has a length of about 60 to 80 meters. In the coiled pipe, the precooked mass, which has been previously heated to a temperature of 110° C, is indirectly heated with saturated stream in countercurrent flow to a temperature of 140° C. Thereafter, the mass flows into a demoisturizing apparatus where the moisture remaining in the mass is removed together with the cooking vapors. In this method, the first demoisturization stage takes place in the precooking machine whereas the second demoisturization stage, that is, the demoisturization to the final moisture content, takes place in the demoisturizing apparatus.

Insofar as the temperatures, the moisture content, the proportion of dry matter and so on are concerned, the more modern method just described corresponds exactly to the older method outlined earlier. Since, in addition, this more modern method requires three separate machines, namely, a precooking machine, a coiled cooking pipe and a vaporizer or demoisturizing apparatus, the disadvantages set forth for the first method described are applicable to the second, more modern method also.

The most modern method today is the method according to the Ter Braak system. Here, the introduction of the ingredients is effected via the same dosing devices as in the two methods described previously. The ingredients are admitted into a premixing apparatus provided with a stirring device and a cold mixing of the ingredients is carried out in the premixing apparatus. The resulting charge is then conveyed into a storage and feed container which must likewise be provided with a stirring device in order to prevent settling of the still undissolved sugar crystals. From the storage and feed container, the sugar syrup solution is forwarded into an annular conduit by means of a conveying pump and is conveyed by individual cooking stations. The individual cooking stations are automatically fed from the annular conduit with the respective quantities of the solution required. It is possible to make use of so-called "rotor cookers". The stirring devices operate with a maximum rotational speed of 150 revolutions per minute.

This third method does not differ from the two previously described methods insofar as it process data are concerned. In this respect, then, the same disadvantages apply here as in the two other methods outlined. The only difference between the first two methods and the last method described resides in that the latter which, in principle, is the same as the other two methods, is carried out with different apparatus than either of the first two methods outlined. The development of this apparatus is obviously based on the recognition that the first two methods described are not well-suited for economical production. On the other hand, the apparatus used for carrying out the last method outlined again consists of a plurality of machines.

SUMMARY OF THE INVENTION

It is an object of the invention to provide a method and arrangement which enable confectioneries to be produced more economically than heretofore.

Another object of the invention is to provide a method and arrangement which enable the apparatus-related expenses required for the production of confectioneries to be reduced from those of the prior art.

A further object of the invention is to provide a method and arrangement for the production of confectioneries which make it possible to minimize the demoisturization of the ingredients which have been brought to the final temperature.

An additional object of the invention is to improve on the known methods of making confectioneries as regards the economy thereof and, in particular, to reduce the expenditures for apparatus which are required for carrying out a method of making confectioneries and to minimize a demoisturization, where necessary, of the mass of ingredients which has been brought to the final temperature.

These objects, as well as others which will become apparent as the description proceeds, are achieved in accordance with the invention. According to the invention, there is provided a method of making confectioneries which, in one of its aspects, comprises combining ingredients of a confectionery to be manufactured so as to form a mass of the ingredients and mixing the ingredients with at least one rotary member or element. Steam is admitted into the mass so as to directly heat the same for cooking of the ingredients to obtain the desired confectionery.

Advantageously, the rotary member is rotated at speeds between about 1500 and 3000 revolutions per minute.

The invention further provides an arrangement for the production of confectioneries which includes a chamber for cooking the ingredients of a confectionary to be manufactured and at least one rotary member or element in the chamber for mixing the ingredients. Admitting means is provided for the admission of steam into the chamber so as to permit direct heating of the ingredients.

It is particularly favorable to provide drive means for the rotary member which is capable of driving the rotary member at a minimum rotational speed of about 1500 revolutions per minute.

The novel features which are considered as characteristic to the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE schematically illustrates one form of an arrangement in accordance with the invention which may be used for carrying out a method according to the invention.

DESCRIPTION OF THE PREFERRED EMBODIMENTS

The invention relates to a method and arrangement for the production of sugar-containing wares or confectioneries as indicated earlier and, in a preferred aspect, to the production of high-boiled sweets such as hard caramel, low-boiled sweets such as soft caramel, jelly products and gum products.

In a method according to the invention, the ingredients for a confectionary to be manufactured are favorably combined in regulated or dosed quantities, mixed with one or more rotating members or elements, heated and subsequently demoisturized where necessary or desirable.

According to a preferred embodiment of the invention, the objects of the invention are achieved in that the stirrers or rotating members revolve at speeds between about 1500 and 3000 revolutions per minute, and simultaneously, the heating of the mass of ingredients is effected directly by the introduction of steam into the mass. The steam is favorably in the form of saturated steam and, advantageously, is superheated steam.

By virtue of the direct introduction of steam into the mass of ingredients, the heat energy may be transferred directly to the mass to be heated so that a good thermal efficiency is achieved. Simultaneously, the portion of the stream which condenses becomes available as water for the recipe. Due to this effect, it becomes possible, for example, in the manufacture of hard caramel, to eliminate the admixture of recipe water at the beginning of the production process which was necessary heretofore. As a result of eliminating the addition of water, the percentage of dry matter may be increased to values of up to 93 or so percent by weight. Thus, whereas 20 percent by weight of water was required heretofore as outlined earlier, of which 18 or so percent by weight had to be vaporized again, it now becomes possible to reduce the final water content before the vaporization process to values of 5 to 8 percent by weight. Accordingly, as compared to the conventional production methods, the subsequent demoisturization process in a method according to the invention requires a considerably shorter period of time and, naturally, a correspondingly smaller amount of energy.

The steam utilized in accordance with the invention should have the quality of drinking water and should be physiologically unobjectionable.

By virtue of the high rotational speed of the stirrer or stirrers, which is several times greater than that used in the conventional production methods, there is obtained an increased turbulence as compared to the conventional production methods. Due to the increased turbulence, the mixing and emulsifying effects are substantially increased and, concomitantly, the homogeneity of the mass of ingredients is improved. It has been found that, in comparison with the products of the prior art, the products thus produced in accordance with the invention are creamier and less sticky and give off substantially lower quantities of moisture during storage.

It may be mentioned here that, in one sense, the term emulsifying denotes maintaining insoluble or soluble particles in suspension in a fluid and finely dividing the particles. When viewed in this sense, it will be appreciated that the process of emulsifying may be effected not only with chemical agents but also by mechanical means. In a method according to the invention, emulsification may be mechanically achieved with the rapidly rotating stirrers.

Another important advantage of the invention resides in that the novel production method may be carried out in a single apparatus. All that is required is a vessel or boiler which is capable of being closed and which is provided with suitable high-speed stirrers or rotary mixing elements, jets or nozzles or the like for forcing in steam and a vacuum device. As a result of this feature of the invention, the efficiency of the production method of the invention may be further increased.

In the production of hard caramel, it is advantageous to continuously heat the mass of ingredients to a temperature of approximately 140° C. Thus, a division into precooking and final cooking stages is no longer necessary.

In the production of soft caramel, an advantageous embodiment of the invention contemplates an initial heating to a temperature of about 60° C. Subsequently, milk and other components of the recipe are added while, at the same time, the mass of ingredients is heated to a temperature of approximately 80° C. Then, after holding the mass at a temperature of about 80° C for a maximum of about 45 seconds, the mass is subjected to a final cooking at a temperature of approximately 125° C while continuing the mixing and emulsifying process. In this embodiment of the invention, it is favorable when sugar and glucose syrup are placed in the machine and directly heated to about 60° C with steam, and when condensed milk, hard fat, lecithin (as an emulsifier) and flavors are subsequently added and the mass of ingredients is heated to 80° C.

In carrying out the novel production method, it may be of advantage for the components used in the manufacture of glucose or starch syrup to be introduced into the main production method together with the other ingredients of the confectionery being produced. In other words, instead of manufacturing glucose or starch syrup and then using such syrup as an ingredient in the production method for a confectionery, it may be advantageous for the starting materials used in the manufacture of the glucose or starch syrup to be utilized as ingredients in the production method for the confectionery. Until now, it was necessary to separately manufacture glucose syrup or the like from the starting materials water and fructose and to then introduce this syrup as an ingredient in the main production method.

It may be mentioned here that the method of the invention is not restricted only to certain recipes but is applicable to all of the conventional recipes for confectioneries such as hard caramel, soft caramel, jelly products and gum products.

By using suitable technical measures, it is possible to maintain the quantity of steam which is available per unit of time, as well as the steam energy which is available per unit of time, substantially constant. As a result, the condensate which is derived from the steam per unit of time may also be maintained substantially constant. Under such conditions, it becomes possible, for a particular recipe, to calculate exactly how much water must be added, where necessary or desirable, beyond that present in the form of condensate from the steam and, similarly, it becomes possible to calculate exactly how much water be withdrawn from the mass of ingredients through demoisturization where it is necessary or desirable to demoisturize.

For all products where the desired final moisture content is in excess of about 6 percent by weight, it is possible to eliminate the demoisturization process. As a guideline, it will usually be necessary to carry out a demoisturization process for high-boiled sweets such as hard caramel. On the other hand, for low-boiled sweets such as soft caramel, the quantity of condensate obtained from the steam may be such, in most cases, as to provide a moisture content corresponding to the final desired moisture content. For jelly products and gum products, it will usually be necessary to add water beyond that derived as condensate from the steam. The moisture content which is present prior to demoisturization, where a demoisturization process is carried out, is generally determined by the recipe, the cooking temperatures and the construction of the apparatus which is used for the overall production method.

In those cases where water beyond that derived as condensate from the steam must be added, the additional water may be introduced as a constituent of the recipe at the beginning of the production method.

The final moisture content for high-boiled sweets such as hard caramel will usually be of the order of 1.5 to 2 percent by weight. For low-boiled sweets such as soft caramel, the final moisture content will usually be between about 5 and 9 percent by weight. Insofar as jelly products or articles are concerned, the final moisture content will usually lie between about 20 and 28 percent by weight. For gum products or articles, the final moisture content will usually be between 10 and 20 percent by weight and, in special instances, may run as high as about 30 percent by weight.

Referring now to the sole FIGURE of the drawing, it is noted that this schematically illustrates one form of an arrangement according to the invention which may be used for carrying out a method according to the invention. The arrangement is here in the form of an apparatus which is generally identified by the reference numeral 1.

The apparatus 1 includes a vessel generally identified by the reference numeral 2 and the vessel 2 has a main body 3 and a cover 4. The cover 4 is mounted so as to be swingable relative to the main body 3. Means is provided for securely locking the cover 4 to the main body 3 when the cover 4 is in its closed position and the locking means may, for instance, be in the form of one or more snap closures. In any event, when the vessel 2 is in its closed and locked position, the vessel 2 is capable of withstanding both overpressure and underpressures.

The vessel 2 is mounted on a stand 5. Secured to and mounted below the vessel 2 is a motor 6. The vessel 2 and the motor 6 are mounted on the stand 5 for tilting movement and one reason for this is to facilitate emptying of the contents of the vessel 2. The contents of the vessel may be evacuated therefrom via a suitable outlet or conduit which has not been shown here for the sake of clarity. The vessel 2 and the motor 6 may be so mounted on the stand 5 as to enable the angle of tilt to be selected as desired or expedient.

The motor 6 has an elongated shaft 7 which extends into the interior of the vessel 2. Mounted on the shaft 7 are blades or paddles 8 whose purpose is to subject the contents of the vessel 2 to mixing and emulsifying actions. The blades 8 are releasably mounted on the shaft 7, that is, the blades 8 are so mounted on the shaft 7 that they may be interchanged. The motor 6 is capable of driving the shaft 7 and, hence, the blades 8, at rotational speeds or about 1500 to 3000 revolutions per minute.

The ingredients for a confectionery to be manufctured are introduced into the vessel 2 and are subjected to a mixing action and a heating action therein. For the purpose of introducing the ingredients into the vessel 2, one or more connections or inlets through which the ingredients may be fed into the vessel 2 are provided at the upper side of the cover 4. The ingredients are favorably fed into the vessel 2 in regulated quantities and it is possible to provide a programming arrangement for accomplishing this, that is, it is possible to provide a programming arrangement for automatically feeding the ingredients into the vessel 2 in regulated amounts.

In order to accelerate the overall production method, it is advantageous to provide a mixing baffle or blade 9 interiorly of the vessel 2. The baffle 9 is rotatably mounted in the vessel 2 and serves to enhance the rotary motion of the ingredients in the vessel 2 as well as the introduction of the ingredients to the vicinity of the rotating blades 8. The baffle 9 may, for example, rotate at a speed of about 30 revolutions per minute.

As described earlier, one important feature of the production method of the invention resides in that the cooking process for the ingredients of a confectionery is, at least in part, effected by the introduction of steam into the mass of ingredients. For this purpose, an admitting arrangement 10 is provided at the bottom of the vessel 2. The admitting arrangement 10 includes a plurality of discharge nozzles or apertures 11 which are arranged in a favorable manner over the bottom of the vessel 2. The admitting arrangement 10 is connected with a suitable source of steam, which has not been illustrated here for the sake of clarity, so as to permit steam to be injected into the mass of ingredients accommodated in the vessel 2. Further, the admitting arrangement 10 is provided with suitable non-return valves in order to prevent the sugar solution or mass of ingredients in the vessel 2 from flowing into the nozzles 11 when the flow of steam into the vessel 2 is interrupted. The non-return valves may be arranged to close automatically when the sugar solution or mass of ingredients in the vessel 2 has attained a predetermined temperature.

The admission of steam into the vessel 2 may be regulated automatically if desired. This may be accomplished, for instance, via an electronic adjustable thermometer.

Suitable means is provided for permitting a vacuum to be established interiorly of the vessel 2. The means for the establishment of a vacuum interiorly of the vessel 2 is identified by the reference numeral 12.

In operation, the vessel 2 may be adjusted so as to be in an upright position. The ingredients of a confectionery to be manufactured are admitted into the vessel 2 via the connections provided in the cover 4 thereof. The baffle 9 is set into rotation and the motor 6 is made operative so as to cause the shaft 7 thereof and, concomitantly, the mixing and emulsifying blades 8 which are interchangeably mounted on the shaft 7, to likewise be set into rotation.

The motor 6 causes the blades 8 to revolve at speeds of 1500 to 3000 revolutions per minute. As a result, the blades 8 effect a particularly intensive mixing of the ingredients as well as particularly intensive comminution and dissolution effects. As mentioned earlier, an acceleration of the overall production method is achieved by virtue of the baffle 9. Due to the favorable arrangement of the blades 8 and the baffle 9 in the working vessel 2, and due also to the high speeds of revolution, a uniform admixture of the ingredients is achieved in a matter of seconds.

During the mixing of the ingredients by means of the blades 8, steam is injected into the mass of ingredients via the nozzles 11 of the admitting arrangement 10 as indicated by the arrows. The steam is used for effecting all or a portion of the cooking process required for the ingredients of the confectionery. The steam heats the ingredients and, since the steam is introduced directly into the mass of ingredients, the heat transfer from the steam to the mass of ingredients is direct. Due to the intensive agitation outlined above, a substantially completely uniform heating of the ingredients is achieved.

The steam admitted into the mass of ingredients condenses and the quantity of the condensate formed corresponds to the existing vapor pressure equilibrium. The condensate, which constitutes all or a part of the water required for the particular recipe, is worked into the mass of ingredients with substantially complete homogeneity due, again, to the intensive agitation achieved interiorly of the vessel 2.

After the desired temperature has been reached, the introduction of steam into the vessel 2 is interrupted. The non-return valves of the admitting arrangement 10 are now closed to prevent an outflow of the sugar solution from the vessel 2 and, as indicated previously, this may be accomplished automatically.

After the treatment of the mass of ingredients in the vessel 2 has been completed, the vessel 2 may be tilted so as to empty it via the outlet or outlets provided for this purpose.

Simultaneously with the mechanical processes described above, or at any expedient time relative thereto, it is possible to make use of indirect thermal processes also. Since such indirect thermal process do not, however, constitute part of the invention per se, a detailed discussion of the indirect heating and cooling methods involved will not be undertaken here.

In order that the production method may be carried out without problems, and in order to insure consistent quality, it is recommended that care be exercised in the preparation of the steam, particularly as regards purity, moisture content and heat content.

In the illustrated embodiment, the vessel 2 advantageously has a capacity of about 25 to 130 liters. However, the invention contemplates other embodiments wherein the working vessel may, for example, have capacities of 200, 300 or 600 liters.

The following Examples are intended to further illustrate the invention. Although certain recipes are set forth, it is to be expressly understood that these are merely representative of the numerous recipes to which the invention is applicable inasmuch as space limitations do not permit all of the recipes to which the invention is applicable to be set forth. For instance, there are at least 100 different recipes for hard caramel and the invention is applicable to all of these. Similarly, there are numerous recipes for glucose syrup alone which constitutes merely one ingredient of many confectioneries. It is reiterated here that the invention is applicable to all of the conventional recipes for confectioneries such as hard caramel, soft caramel, jelly products and gum products and, accordingly, the Examples are to be understood as illustrative only and not as limiting the invention in any manner.

EXAMPLE 1

This Example relates to the production of hard caramel. The following ingredients are used:
- 100 kilograms of crystal sugar
- 80 kilograms of glucose syrup
- 10 kilograms of 70 percent by weight sorbitol as an agent for accelerating recrystallization of sugar.

These ingredients are admitted into a working vessel without water using conventional dosing methods. In the vessel, the ingredients are intensively mixed and homogenized by means of stirrers which rotate at speeds between about 1500 and 3000 revolutions per minute. At the same time that the motor which drives the stirrers is switched on, saturated steam is blown directly into the mass of ingredients to be treated via nozzles or the like provided in the working vessel. The mass of ingredients is heated without interruption to a temperature of 140° C by the steam while being continuously agitated. During the heating of the mass, approximately 11.4 liters of water is introduced into the mass of ingredients in the form of condensate from the steam. When the desired final temperature is reached, the mass of ingredients has a moisture content of about 6 percent by weight. The mass of ingredients is demoisturized under vacuum in the same vessel as that in which heating of the ingredients took place. The demoisturization is carried out until a moisture content of about 1.5 to 2 percent by weight, which corresponds to about 98 to 98.5 percent by weight of dry matter, is achieved.

It is basically possible to heat the mass of ingredients to a temperature of 110° C, for instance, by the direct introduction of steam into the mass of ingredients and to subsequently revert to indirect heating methods for heating the mass of ingredients to a temperature of 140° C. It may be further mentioned here that the steam introduced into the mass of ingredients may be superheated steam.

In conventional methods for the production of hard caramel, 37 liters of water are added as opposed to the 11.4 liters of condensate which are present in Example 1.

EXAMPLE 2

This Example relates to the production of soft caramel. Water, sugar and glucose syrup are introduced into a working vessel via a conventional dosing device. In the vessel, the ingredients are subjected to the action of stirrers which rotate at speeds between about 1500 and 3000 revolutions per minute. As a result, the ingredients are mixed and emulsified. Steam is introduced directly into the mass of ingredients accommodated in the vessel and the ingredients are thus heated to a temperature of about 60° C. After a temperature of about 60° C has been reached, milk, molten hard fat and an emulsifier, namely, lecithin, are added to the ingredients already present in the working vessel. Simultaneously with the addition of the milk, the fat and the emulsifier, the mass of ingredients is heated to a temperature of 80° C. The mass of ingredients is held at a temperature of 80° C for about 45 seconds while mixing and emulsification of the mass are continued. Thereafter, the mass of ingredients is heated to a temperature of approximately 120° C where cooking of the mass is completed. The final moisture content of the mass lies between about 5 and 9 percent by weight. The desired final moisture content may be obtained by thickening the mass of ingredients under vacuum in the same vessel as that in which heating of the mass was effected.

Instead of introducing glucose syrup per se into the working vessel as described in Example 2, it is possible to introduce into the working vessel the components which are required for manufacturing the glucose syrup.

EXAMPLE 3

This Example relates to the production of a jelly product. The gelling and binding agents are prepared in conventional manner. The following ingredients are used:
- 50.5 kilograms of crystal sugar
- 1.2 kilograms of dry pectin
- 20.5 kilograms of glucose syrup
- Coloring agents and flavoring agents These ingredients are dosed into a working vessel using a conventional sequence. The sequence involves introducing the glucose syrup into the working vessel and thereafter introducing the crystal sugar into the vessel. The resulting mass is heated to a temperature of at least 80° C and, after reaching this temperature, dissolved pectin is added and mixed in. The glucose syrup and the crystal sugar are mixed and homogenized by means of stirrers which rotate at speeds between about 1500 and 3000 revolutions per minute. Simultaneously with mixing and homogenization, steam is fed directly into the mass so as to heat the same to a temperature of at least 80° C where pectin is added and mixed into the mass by means of the stirrers.

The moisture content of a finished jelly product lies between about 20 and 28 percent by weight depending upon the precise and the final temperature. Since, depending upon the regulating device for controlling the quantity of steam admitted into the working vessel, as well as upon the quality of the steam, the condensate derived from the steam during direct heating of the mass of ingredients lies between about 6 and 8 percent by weight only, it is necessary to add water beyond that derived as condensate from the steam. The quantity of water which must be added beyond that derived as condensate from the steam equals the quantity of water prescribed by the particular recipe minus the quantity of water derived as condensate from the steam minus the water content of the glucose syrup. The water added beyond that derived as condensate from the steam is dosed into the working vessel at the beginning of the production method. If the mass of ingredients in the working vessel has a moisture content between about 20 and 28 percent by weight at the end of the treatment, a thickening or demoisturization of the mass may not be required.

EXAMPLE 4

This Example relates to the production of a gum product. The gelling and binding agents are prepared in conventional manner. The following ingredients are used:
- 4.0 kilograms sugar
- 3.2 kilograms starch syrup
- 1.0 kilograms gelatin
- 0.1 kilograms citric acid These ingredients are dosed into a working vessel during a conventional sequence. The sequence involves introducing the starch syrup and the sugar into the vessel and heating to at least 100° C. The resulting mass is thereafter cooled to 80° C by an indirect cooling method. The gelatin and citric acid are then added and the mass of ingredients is subsequently cooled to 60° C. The starch syrup and the sugar are mixed and homogenized by means of stirrers which rotate at speeds between about 1500 and 3000 revolutions per minute. Simultaneously with the mixing and homogenization, steam is fed directly into the mass so as to heat same to a temperature of at least 100° C.

The moisture content of a finished gum product normally lies between about 10 and 20 percent by weight but may be as high as about 30 percent by weight in special instances. The final moisture content in a particular case will depend upon the regulating device for controlling the quantity of steam admitted into the working vessel, as well as upon the quality of the steam, the condensate derived from the steam during direct heating of the mass of ingredients lies between about 6 and 8 percent by weight only, it is necessary to add water beyond that derived as condensate from the steam. The quantity of water which must be added beyond that derived as condensate from the steam equals the quantity of water prescribed by the particular recipe minus the quantity of water derived as condensate from the steam. It may further be necessary or desirable, in calculating the quantity of water which must be added beyond that derived as condensate from the steam, to take into account the water present in the other ingredients. In any event, the water added beyond that derived as condensate from the steam is dosed into the working vessel at the beginning of the production method. If the mass of ingredients in the working vessel has a moisture content between about 10 and 30 percent by weight at the end of the treatment, a thickening or demoisturization of the mass may not be required.

The advantages achievable with the novel method may be summarized as follows:

1. Lower energy costs due to better utilization of energy and better efficiency of the apparatus.
2. Substantial improvement in economy due to a reduction in the proportion of water.
3. Increase in dry matter to 93 percent by weight.
4. Improvement in the homogeneity of the manufactured products which are creamier and less sticky.
5. Substantially smaller amounts of moisture released from the products during storage of the same.
6. A more expedient and economical progression of the production method, particularly when all of the treatments are carried out in a single apparatus.

It will be understood that each of the elements described above, or two or more together, may also find a useful application in other types of methods and apparatus differing from the types described above.

While the invention has been illustrated and described as embodied in a method and apparatus for making hard caramel, soft caramel, jelly products and gum products, it is not intended to be limited to the details shown, since various modifications and structural changes may be made without departing in any way from the spirit of the present invention.

Without further analysis, the foregoing will so fully reveal the kind of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of making low boiled confectioneries comprising combining a plurality of first confectionery ingredients, heating said ingredients to an initial temperature of 60° C by directly admitting steam therein, subsequently adding a plurality of additional confectionery ingredients including milk to form a confectionery mass while continuously heating said mass to approximately 80° C by directly admitting steam, maintaining said mass at approximately 80° C for a maximum of about 45 seconds and subsequently heating said mass to a temperature of approximately 125° C by directly admitting steam to complete cooking of said mass, said confectionery being continuously mixed and emulsified by at least one rotary member at speeds between about 1500–3000 rpm throughout heating.

2. A method of making confectioneries, comprising the steps of combining ingredients of a confectionery so as to form a mass of said ingredients; mixing said ingredients with at least one rotary member rotated at speeds between about 1500 and 3000 revolutions per minute; admitting steam into said mass so as to directly heat the same for cooking of said ingredients to obtain the desired confectionery, said step of mixing and said step of admitting steam being performed simultaneously with one another.

3. The method of claim 2, wherein said ingredients are combined in regulated quantities, and said steam is in the form of saturated steam.

4. The method of claim 3, further comprising the step of demoisturizing said mass subsequent to the step of admitting said steam therein.

5. The method of claim 2, wherein said steam comprises superheated steam.

6. The method of claim 2, wherein said confectionery is a member of the group consisting of hard caramel, soft caramel, jelly candies and gum candies.

7. The method of claim 2, wherein said confectionery is a hard caramel; and wherein said mass is substantially continuously heated to a temperature of about 140° C.

8. The method of claim 2, wherein said confectionery includes glucose syrup, and wherein the ingredients for manufacture of said glucose syrup are incorporated in said confectionery mass.

9. The method of claim 2, wherein said confectionery includes starch syrup, and wherein the ingredients for manufacture of said starch syrup are incorporated in said confectionery mass.

10. The method of claim 2, wherein said confectionery is a member of the group consisting of hard caramel, soft caramel, jelly candies and gum candies.

11. A method of making a hard caramel confectionery containing a predetermined quantity of water comprising the steps of combining the caramel ingredients in substantially dry form so as to form a mass of said ingredients; mixing said mass by means of at least one rotary member; and admitting steam into said mass so as to directly heat said mass and to become at least partially condensed within said mass so that the water produced by condensation of the steam furnished said predetermined quantity of said water.

* * * * *